2,797,219

METHOD OF PREPARING 2,6-DICHLORO-PYRAZINE

William Edgar Taft, Stamford, Conn., assignor to American Cyanamid Company, New York, N. Y., a corporation of Maine No Drawing. Application November 15, 1955, Serial No. 547,043

5 Claims. (Cl. 260—250)

This invention relates to a new process of chlorinating chloropyrazine. More particularly, it relates to a chlorination process yielding predominantly 2,6-dichloropyrazine.

The chlorination of pyrazine and chloropyrazine to polychloro compounds has been described in several United States patents, for example, 2,442,473, 2,524,431, 2,540,476 and 2,573,268. In all of these processes the reaction is carried out in the vapor phase at temperatures in excess of 300° C. By these methods a mixture of all of the three possible isomeric dichloropyrazines in substantially equal amounts is always obtained.

One of the outstanding features of the present process, which is of great practical importance, is the high isomer specificity of the reaction. The present process gives high yields of the 2,6-isomer containing only a minor amount of the 2,3-isomer and substantially none of the 2,5-isomer. This is in contrast to the previously described methods for chlorinating pyrazine or chloropyrazine, in which all of the possible dichloropyrazine isomers as well as higher halogenation products are always obtained. Obviously, it is uneconomical to prepare several isomeric forms when only one is desired, and in addition these mixtures of isomeric forms are both difficult and expensive to separate into the desired isomers.

Another advantage of the present process is the fact that it is carried out at a relatively low temperature under anhydrous conditions. Former methods all require high temperatures and, in some cases, the presence of steam. The reaction mixture containing chlorine and hydrochloric acid in the presence of steam is highly corrosive and severely limits the type of reaction vessels that can be used. In the present process at lower temperatures, less corrosion takes place and the reaction can be handled in conventional equipment.

A still further advantage of the present process is that it is capable of producing large amounts of 2,6-dichloropyrazine to the substantial exclusion of other isomers. This compound is a highly desirable intermediate for the preparation of very useful anticoccidial agents, such as N'-(6-chloro-2-pyrazinyl)sulfanilamide, described and claimed in United States Patent No. 2,475,673.

The table given on the following page is a summary of four tests in which 2-sulfanilamido-6-chloropyrazine was compared with 2-sulfanilamidoquinoxaline for activity against cecal coccidiosis in chickens.

TABLE I

*Prophylactic drug-diet trials in cecal coccidiosis*

| Percent Drug-Diet Concentrations | 2-Sulfanilamido-6-chloropyrazine | | 2-Sulfanilamido-quinoxaline | | Untreated Controls | |
|---|---|---|---|---|---|---|
| | Alive/Total | Percent Survival | Alive/Total | Percent Survival | Alive/Total | Percent Survival |
| 0.025 | 18/20 | 90 | 53/77 | 69 | | |
| 0.0187 | 19/20 | 95 | 37/60 | 62 | | |
| 0.0125 | 79/99 | 80 | 20/80 | 25 | | |
| 0.0093 | 44/60 | 73 | | | | |
| 0.0062 | 43/80 | 54 | | | | |
| | | | | | 22/129 | 17 |

In these tests 2-sulfanilamido-6-chloropyridazine and 2-sulfanilamidoquinoxaline were administered to one-week old chicks prophylactically, in drug-diets, beginning two days before infection with oocysts of *Eimeria tenella*, the etiological agent causing cecal coccidiosis. Drug-diet administration was continued for 12 days (10 days post-infection)) The average time of mortality in untreated controls was five days after infection.

The recommended levels of 2-sulfanilamidoquinoxaline for commercial use in feed is 0.0125 to 0.01875%. The table shows that 2-sulfanilamido-6-chloropyrazine is markedly superior to 2-sulfanilamidoquinoxaline at drug concentrations of 0.0187 and 0.025%. At concentrations of 0.0125, 0.0093 and 0.0062%, 2-sulfanilamido-6- chloropyrazine shows a higher percent survival than that of 2-sulfanilamidoquinoxaline at twice each of the respective levels.

It is concluded that, at the selected concentrations stated above, 2-sulfanilamido-6-chloropyrazine is from two to three times more effective than is 2-sulfanilamidoquinoxaline in preventing mortality in chickens due to cecal coccidiosis.

In the present process the chlorination is carried out using a chlorinating agent in the liquid phase at reasonably low temperatures and pressures which produces the 2,6-isomer in high yield. In some cases a small amount of the 2,3-isomer is produced in the present process; however, substantially none of the 2,5-isomer has been detected.

Chlorination of organic compounds with chlorinating agents such as sulfuryl chloride is a well-known reaction. However, its application in the chlorination of chloropyrazine is unusual in several respects. Previously, the use of sulfuryl chloride as a chlorinating agent has been applied almost exclusively to hydrocarbon compounds. In these reactions, almost without exception, a halogen carrier such as sulfur monochloride and/or aluminum chloride is employed as catalyst. These reactions, furthermore, are generally carried out below the boiling point of sulfuryl chloride, which is about 69° C. This is in contrast to the present process in which the chlorination of a heterocyclic compound is effected in the absence of a catalyst at a temperature of at least 65° C.

It is well known that sulfuryl chloride dissociates into sulfur dioxide and chlorine at elevated temperatures. This dissociation is reported to be almost nonexistent below 100° C., but increases rapidly to near complete dissociation around 200° C. The attainment of such equilibrium is said to be slow unless catalyzed. One of the catalysts considered effective is charcoal; however, in regard to the process of the present invention, charcoal has been found to have little effect on the sulfuryl chloride-chloropyrazine reaction. Furthermore, it was found that carrying out the reaction of the present invention under pressure has a tendency to suppress the dissociation of sulfuryl chloride.

The mechanism of the reaction in the above process is not known; however, it appears probable that chlorine is the active chlorinating agent, for it has been found that the reaction will take place with chlorine alone under essentially the same conditions. Sulfuryl chloride may thus be a convenient form of introducing chlorine to the reaction mixture.

Whether the reaction actually takes place in the liquid or vapor phase in this process is not known, since both phases are present under the reaction conditions. However, as the present reaction takes a different course than the chlorinations of pyrazine or chloropyrazine, which were carried out exclusively in the vapor phase, it seems that the presence of a liquid phase is important to this process. As described in United States Patent No. 2,573,268, chlorine and chloropyrazine do not react below 275° C. in the vapor phase. The present reaction is carried out under pressure so that the liquid phase is present throughout. At the beginning of the reaction, this consists of chloropyrazine and sulfuryl chloride or chlorine. Later, as the 2,6-dichloropyrazine is formed, this is also present in the liquid phase.

In carrying out the process of the present invention, it is desirable to maintain a temperature of from about 65° C. to about 150° C. At temperatures below 65° C., little or no reaction takes places and temperatures above 150° C. do not add to the desirability of the process.

The process of the present invention is generally carried out under autogenous pressure, which naturally varies with temperature and the amount of free space in the reaction vessel. The most desirable pressure seems to be that within the range of 50 p. s. i. to about 1000 p. s. i.

The time required to carry out the process of the present invention is dependent upon the temperature and is not critical. Good results have been obtained with a reaction time of 12 minutes to 18 hours. The preferred time is from about one hour to about three hours for a batch process; however, as a continuous process it may be complete in a manner of a few minutes to an hour.

The amount of chlorinating agent, which can be sulfuryl chloride, chlorine or a mixture of the two, should be at least an amount molecularly equivalent to the amount of chloropyrazine. Best results have been obtained when about 10% excess of chlorinating agent is used, although a larger excess was not found to be harmful.

When the process of the present invention is complete, the isolation of the reaction product, 2,6-dichloropyrazine, can be carried out in several ways. The crude material is an oily solid when cold, which may be removed as is from the reaction vessel. The crude material can also be melted and poured out either before or after washing with a dilute alkaline solution. It is also possible to steam distill the product from weakly basic solution either before or after removal from the chlorination vessel. The steam distilled product is generally colorless and can easily be obtained by cooling the distillate and filtering off the crystalline product. Finally, the product can be isolated by extraction from aqueous alkaline solution or steam distillates with water immiscible solvents such as ether, benzene, ethyl acetate and the like.

The product obtained in any of the above methods of isolation is generally suitable for further reaction, such as conversion to sulfachloropyrazine. If further purification is desired, it may be accomplished by steam distillation, recrystallization from solvents such as dilute alcohol or by fractional distillation at reduced pressure.

The following examples illustrate in detail the chlorination of chloropyrazine in a batch process or as a continuous process to produce high yields of 2,6-dichloropyrazine.

*Example 1*

A total of 115 parts of chloropyrazine and 135 parts of sulfuryl chloride are combined in a suitable pressure vessel. The vessel is maintained at 120° C. for 18 hours. At the end of this time the vessel is opened and the contents are treated with water. The resulting mixture is made alkaline with sodium hydroxide with cooling and the resulting solid is taken up in ether and separated. The aqueous portion is extracted with four 50 ml. portions of ether. All the ether extracts are combined and placed over anhydrous calcium sulfate. After filtration and removal of the ether, the residue is distilled to yield 111 parts of distillate boiling at 172–182° C. It solidifies on cooling. Analysis indicates this product consists of 90.6% 2,6-dichloropyrazine (67.5% conversion).

*Example 2*

A total of 100 parts of chloropyrazine and 74 parts of chlorine are combined in a suitable pressure vessel, which is maintained at 100° C. for 18 hours. At the end of this time, the contents are removed with hot water, then the mixture is made alkaline with sodium carbonate and steam distilled. The resulting white, crystalline solid is taken up in ether and separated from the aqueous layer. The aqueous layer was extracted with ether and the ether extracts are combined and placed over anhydrous calcium sulfate. After filtration and removal of the ether, the residue yields 85 parts of water-white distillate boiling at 179–184° C. Analysis indicates this product consists of 87.6% 2,6-dichloropyrazine (57% conversion).

*Example 3*

A total of 115 parts of chloropyrazine and 88 parts of chlorine are combined in a pressure vessel which is then heated at 100° C. for four hours. At the end of this time, the contents are removed with hot water, made basic with sodium carbonate and steam-distilled. The product is separated from the cooled distillate as a white, crystalline, slightly moist material weighing 113 parts. An analysis indicates this product consists of 87.3% 2,6-dichloropyrazine (65.9% conversion).

*Example 4*

Chloropyrazine, 114 parts, sulfuryl chloride, 15 parts, and chlorine, 80 parts, are combined in a suitable sealed pressure vessel and heated at 100° C. for three hours. The reaction mixture is then cooled, diluted with water and basified to approximately pH 8 with sodium carbonate, further cooled to crystallize the semi-solid and filtered. The weight of damp product is 114 parts. By analysis this is shown to contain 86.2% 2,6-dichloropyrazine (66.2% conversion).

*Example 5*

Chloropyrazine, 287 parts, and sulfuryl chloride, 362 parts, are heated together in a sealed pressure vessel for 18 hours at 120° C. The reaction product is then cooled, diluted with water, made basic with sodium carbonate and the mixture steam distilled. The white crystalline material which collects in the distillate is filtered off and pressed as dry as possible to give 343 parts of crude product. By analysis this consists of 93.1% 2,6-dichloropyrazine (85.6% conversion).

*Example 6*

By following the general procedure of Example 5, using chloropyrazine, 114 parts, sulfuryl chloride, 149 parts, and reaction conditions of 3.4 hours at 80–90° C., there were obtained 136.5 parts of product, which contained 87.5% 2,6-dichloropyrazine (80.0% conversion).

*Example 7*

The process of Example 6 is repeated in all details except that the reaction time is reduced to 0.2 hour. There were obtained 110 parts of product, which contained 75.9% 2,6-dichloropyrazine (56.0% conversion).

*Example 8*

The process of Example 6 is repeated in all details except that the reaction conditions are two hours at 120° C. The yield of product is 113 parts which consist of 96.6% 2,6-dichloropyrazine, 0.8% monochloropyrazine and no 2,3- or 2,5-dichloropyrazine (73.6% conversion).

*Example 9*

Chloropyrazine, 800 parts, and sulfuryl chloride, 1,040 parts, are sealed in a nickel autoclave. The mixture is heated slowly until an exothermic reaction sets in at 68° C. External heating of the charge is stopped at once and external cooling applied to the autoclave, but the temperature of the contents continues to rise to about 85° C. over a period of approximately seven minutes. The internal temperature then falls to 76° C. over the next six minutes. Heating is then resumed, and the temperature of the charge rises to 94° C. over the next 20 minutes. The internal temperature is then held at 95–101° C. for two hours. Heating is then stopped and the autoclave cooled by external means for about one hour until the internal temperature reaches 30° C. The autoclave is then opened, the contents removed diluted with water, made alkaline with sodium carbonate and finally isolated by steam distillation and filtration as in previous examples to give a comparable yield of 2,6-dichloropyrazine.

Example 10

2-chloropyrazine (11.5 parts) is heated with excess liquid chlorine at 115–120° C. in a sealed tube for a period of time ranging between 15 minutes and three hours. The tube is cooled before opening. The crystalline product is removed by adding water and heating to approximately 70° C. The mixture is made alkaline with sodium carbonate until a pink spot on phenolphthalein paper is obtained. 2,6-dichloropyrazine is obtained as a white, crystalline solid by steam distillation of the mixture. The product is filetred, washed with cold water and sucked as dry as possible.

The following results were obtained:

| Time of Reaction | Percent 2,6-dichloropyrazine | Percent yield |
| --- | --- | --- |
| 15 min | 92.9 | 77.5 |
| 30 min | 95.0 | 73.9 |
| 60 min | 93.1 | 80.0 |
| 120 min | 96.4 | 78.8 |
| 180 min | 98.7 | 89.7 |

No 2,3-isomer or unreacted monochloropyrazine was detected in the above products.

Example 11

Sixteen parts of 2-chloropyrazine and 10 or more parts of cholorine are fed continuously into a reactor in which they are heated to 70° C. to 150° C. up to a pressure of 300 to 1000 p. s. i. for one to 30 minutes. The mixture is then continuously discharged into water. 2,6-dichloropyrazine is obtained as a white crystalline solid by steam distillation. Unreacted starting material is recovered for reuse from the aqueous phase of the distillate.

Example 12

In a further experiment similar to Example 11, 19 or more parts of sulfuryl chloride are used instead of chlorine. The 2,6-dichloropyrazine is recovered as a white crystalline solid.

I claim:

1. An improved process for the preparation of 2,6-dichloropyrazine which comprise heating chloropyrazine with a member of the group consisting of chlorine, sulfuryl chloride and chlorine-sulfuryl chloride at a temperature within the range of 65° C. to 150° C. under a pressure of from 50 to 1000 p. s. i.

2. An improved process for the preparation of 2,6-dichloropyrazine which comprises heating chloropyrazine with sulfuryl chloride at a temperature within the range of 65° C. to 150° C. for a period of from ⅓ hour to 18 hours under a pressure of from 50 to 1000 p. s. i.

3. An improved process for the preparation of 2,6-dichloropyrazine which comprises heating chloropyrazine with chlorine at a temperature within the range of 65° C. to 150° C. under a pressure of from about 50 to 1000 p. s. i. for a period of from ⅓ hour to 18 hours.

4. An improved process for the preparation of 2,6-dichloropyrazine which comprises heating a mixture of chlorine and sulfuryl chloride at a temperature within the range of 65° C. to 150° C. under a pressure of from about 50 to 1000 p. s. i. for a period of from one to three hours.

5. A continuous process for the preparation of 2,6-dichloropyrazine which comprises bringing together chloropyrazine and chlorine at a temperature within the range of 70° C. to 150° C. and a pressure of from about 300 to 1000 p. s. i. for a period of a few minutes to one hour.

No references cited.